(12) United States Patent
Hanemaaijer

(10) Patent No.: US 9,981,225 B2
(45) Date of Patent: May 29, 2018

(54) METHOD OF CONVERTING THERMAL ENERGY INTO MECHANICAL ENERGY, AND AN APPARATUS THEREFOR

(75) Inventor: Jan Hendrik Hanemaaijer, 's-Gravenhage (NL)

(73) Assignee: NEDERLANDSE ORGANISATIE VOOR TOEGEPAST-NATUURWETENSCHAPPELIJK ONDERZOEK TNO (NL)

( * ) Notice: Subject to any disclaimer, the term of this patent is extended or adjusted under 35 U.S.C. 154(b) by 349 days.

(21) Appl. No.: 14/002,151

(22) PCT Filed: Feb. 29, 2012

(86) PCT No.: PCT/NL2012/000018
§ 371 (c)(1),
(2), (4) Date: Sep. 30, 2013

(87) PCT Pub. No.: WO2012/118369
PCT Pub. Date: Sep. 7, 2012

(65) Prior Publication Data
US 2014/0014583 A1    Jan. 16, 2014

(30) Foreign Application Priority Data
Mar. 1, 2011    (NL) .................................... 1038624

(51) Int. Cl.
*B01D 61/36* (2006.01)
*F03B 13/00* (2006.01)
*F03G 7/00* (2006.01)

(52) U.S. Cl.
CPC ......... *B01D 61/368* (2013.01); *B01D 61/364* (2013.01); *B01D 61/366* (2013.01);
(Continued)

(58) Field of Classification Search
CPC .. B01D 61/366; B01D 61/368; F05B 2220/60
See application file for complete search history.

(56) References Cited

U.S. PATENT DOCUMENTS 4,473,473 A * 9/1984 Cheng ................. B01D 61/364
203/10
4,728,397 A   3/1988 Kjellander et al.
(Continued)

FOREIGN PATENT DOCUMENTS

EP    0 190 741 A1    8/1986
JP    04346823 A  *  12/1992
(Continued)

OTHER PUBLICATIONS

Experimental Studies DCMD pdf—"Experimental study of desalination using direct contact membrane distillation: a new approach to flux enhancement"—Tzahi Y. Cath et al—Journal of Membrane Science 228—2004.*
(Continued)

*Primary Examiner* — Krishnan S Menon
*Assistant Examiner* — Bradley R Spies
(74) *Attorney, Agent, or Firm* — Thompson Hine LLP

(57) ABSTRACT

The invention relates to a method of converting thermal energy into mechanical energy wherein a working liquid such as is evaporated to generate a stream of a working fluid. According to the invention, the stream of the working fluid is a stream of pressurized distillate produced by evaporation and condensation using a direct contact membrane distillation (DCMD) unit, said stream of pressurized distillate having a pressure of at least one bar, and a converter such as a turbine is used for generating mechanical energy from said stream of said pressurized distillate. The invention also relates to an apparatus for performing the method.

22 Claims, 2 Drawing Sheets

Figure 1:
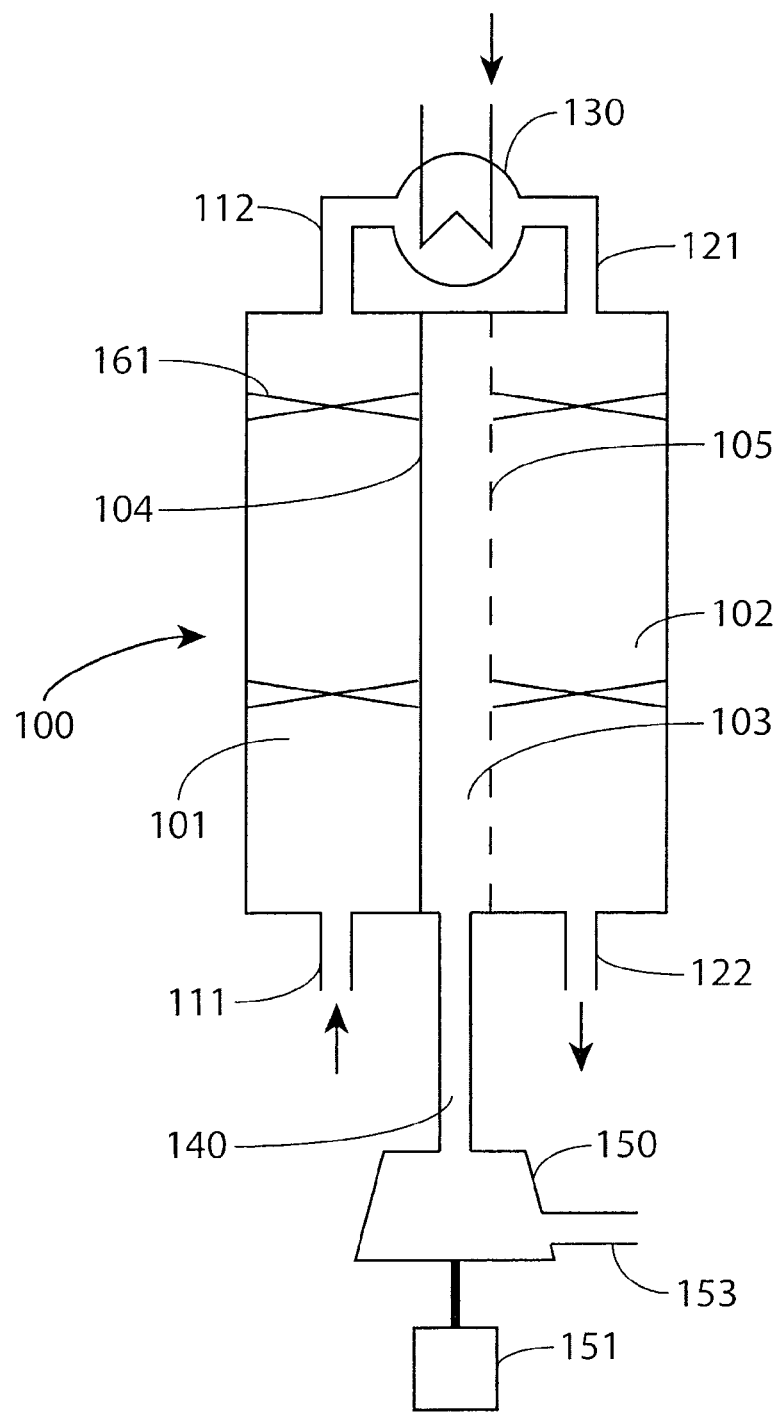

(52) U.S. Cl.
CPC ............... *F03B 13/00* (2013.01); *F03G 7/00* (2013.01); *F05B 2220/602* (2013.01); *F05B 2220/62* (2013.01); *Y02B 10/50* (2013.01)

(56) References Cited

U.S. PATENT DOCUMENTS

| | | |
|---|---|---|
| 2006/0144789 A1 | 7/2006 | Cath et al. |
| 2010/0072135 A1* | 3/2010 | Hanemaaijer ........ B01D 1/0035 210/640 |
| 2010/0199667 A1 | 8/2010 | Ullman |
| 2011/0031100 A1* | 2/2011 | Qtaishat ............... B01D 61/364 202/205 |
| 2012/0038161 A1* | 2/2012 | Outhred ................. F03B 13/10 290/50 |

FOREIGN PATENT DOCUMENTS

| | | |
|---|---|---|
| WO | 2010/071927 A1 | 7/2010 |
| WO | 2012/118369 A3 | 9/2012 |

OTHER PUBLICATIONS

Pilot-Scale Studies for DCMD pdf—"Pilot-Scale Studies for Direct Contact Membrane Distillation-Based Desalination Process"—Kamalwah K. Sirkar et al—Desalination and Water Purification Research and Develpment Program Report No. 134, US Department of the Interior, Bureau of Reclamation—Sep. 2009.*
JP 04346823 Machine Translation.pdf—Funabashi, Kiyomi et al—Dec. 1992—Translated Abstract.*
PCT, International Search Report, PCT/NL2012/000018 (dated Jan. 18, 2013), 3 pages.
Funabashi et al.; Machine English translation of JP H04-346823, published Dec. 1992 (5 pages).

* cited by examiner

METHOD OF CONVERTING THERMAL ENERGY INTO MECHANICAL ENERGY, AND AN APPARATUS THEREFOR

RELATED APPLICATIONS

This application is a National Phase of co-pending PCT/NL2012/000018 filed Feb. 29, 2012, which claims priority to NL 1038624 filed Mar. 1, 2011, each of which is expressly incorporated by reference herein in its entirety.

The present invention relates to a method of converting thermal energy into mechanical energy wherein a working liquid is evaporated to generate a stream of a working fluid.

There is an enormous drive to use energy as well as possible, both for economical and environmental reasons. Low-grade heat is available in large quantities, be it waste heat from industrial processes or other sources such as geothermal. It may also be obtained by generating it using solar collectors. Especially in electricity producing processes (powerplants, fired by either coal, oil, gas, nuclear fuel, or concentrated solar power) vast amounts of low-grade heat are released to the environment without further use, during the condensation of low-pressure water vapour leaving the steam turbines. Unfortunately, most in demand is high-grade energy, such as mechanical energy which can be converted into electricity, which is even more in demand.

The object of the present invention is to provide an alternative method to convert thermal energy into mechanical energy.

To this end, a method according to the preamble is characterized in that the stream of the working fluid is a stream of pressurized distillate produced by evaporation and condensation using a direct contact membrane distillation (DCMD) unit, said stream of pressurized distillate having a pressure of at least one bar, and a converter is used for generating mechanical energy from said stream of said pressurized distillate.

The method according to the present invention allows for the continuous suppletion of distillate liquid while the distillate liquid is at elevated pressure. The method according to the present invention will be usually be integrated with another method involving the distillation of a liquid, so the mechanical energy generated with the method according to the present invention can be considered a desirable by-product of the other method, an example of which is the production of water for consumption or for agricultural purposes. The converter is for example a turbine, such as commonly used for the generation of hydro-electrical energy. A recent example of a small scale converter is described in WO2010/071927, but any converter may do, such as one comprising a cylinder and a piston The pressure of the stream of pressurized distillate is preferably at least 5 bar, more preferably at least 10 bar. Higher pressures than that are even more preferred as they increase the efficiency of the conversion of thermal energy into mechanical energy, in which case the resulting energy can be valued to be more than a by-product. In the present application, any pressure mentioned is a gauge pressure (overpressure). With the working fluid being a liquid, high pressures can be achieved easily. Also, they are very safe compared to a pressurized gas. A typical working liquid will be water. Membranes commonly used in DCMD can have porosities of 90% by volume or higher. For the method according to the present invention lower porosities, such as below 85% by vol., more specifically less than 80% by vol. may be selected instead in order to more easily withstand the pressures involved by ensuring that the membrane has sufficient mechanical strength to resist the pressure exerted. In a DCMD process, there are two liquids, one being retentate liquid in contact with one side of the membrane, the other being distillate liquid in contact with the other side of the membrane. The distillate liquid will be relatively cool compared to the retentate liquid. In the membrane, a vapour phase is present in the pores of the membrane, as a result of which the liquids are not in liquid contact with each other. The temperature difference results in the net transport of vapour from the retentate to the distillate liquid. At the retentate side of the membrane, the pressure will for example be a couple of bar, whereas constriction of the flow of distillate liquid by making the distillate liquid perform work may result in a significantly higher pressure of the distillate liquid. Without wishing to be bound by any theory, it is believed that at the side of the distillate liquid, the relatively high pressure causes the distillate liquid to enter the membrane over a tiny distance. The resulting increase in surface area of the distillate liquid results in a counter force as a result of which the distillate liquid cannot pass the membrane and a difference in pressure over the membrane can be maintained. Vapour can still pass from the retentate side to the distillate side. Thus it passes from a state at (generally) relatively low pressure at the retentate side to a state at a (preferably) relatively high pressure. The applicant has realised that in this manner the membrane distillation unit can act as a pump. A DCMD membrane distillation unit suitable for the method according to the invention is a DCMD membrane distillation unit with recycle flow in the distillate channels. Such unit is known in the art.

US2010/0224476 discloses a method of recovering heat from distillate downstream of a membrane-distillation unit.

WO2010/071927 discloses a power generating apparatus using an impeller to generate energy in a fluid flow conduit. The fluid may be a gas or a liquid, such as water. In the abstract only mention is made of distillation devices.

According to a preferred embodiment, the converter is connected to a generator for generating electricity.

Electricity is a very desirable form of high-grade energy.

According to a preferred embodiment, the DCMD unit comprises a first chamber and a second chamber, the first chamber having a first inlet for a relatively cold liquid and first outlet for relatively warm liquid, a heat exchanger for heating the relatively warm liquid, and the second chamber having a second inlet for heated relatively warm liquid to be passed in counter-current with the relatively cold liquid to result in the relatively warm liquid, where the first chamber and the second chamber are separated by an impermeable, heat-exchanging wall a membrane capable of excluding liquid and allowing the passage of vapour of the liquid in the second chamber from the second chamber to a space between the heat-exchanging wall and the membrane, condensation of the vapour against the heat exchanging wall resulting in distillate in said space, said space being connected to a converter, and pressurized distillate is passed from the space to the converter for generating mechanical energy.

This type of DCMD is less complex and easier to build with high pressures in mind. In case of water as a working liquid, the membrane will provide a hydrophobic barrier. Also, in case of water the relatively warm liquid will be heated by the heat exchanger to a temperature of at least 40° C., as even with such low temperatures it is possible to generate electricity. In the present application, the expression "condensation of the vapour against the heat exchanging wall" is intended to mean condensation of water at the side of the membrane opposite to the retentate side of the membrane, as this condensation is indirect (that is, the heat exchanging wall is already covered with distillate).

According to a preferred embodiment, the relatively warm liquid is heated by the heat exchanger to a temperature of at least 80° C., preferably at least 100° C., and more preferably at least 120°.

A higher temperature will result in both a higher flux (liter per m² membrane surface area per hour) and a higher recovery (distillate yield), and thus in a higher production of both working liquid, i.e. the distillate such as water, and of mechanical energy.

According to a preferred embodiment, at least one of the first chamber and the second chamber comprises a load-bearing spacer to maintain the dimensional stability of said chamber, said load-bearing spacer allowing the passage of liquid from the inlet to the outlet of the chamber concerned.

This allows the chamber concerned to retain its dimensions, and allows the liquid in the chamber concerned to be at a lower pressure than the pressurized working liquid in the space. The term "load-bearing" means that the spacer is structurally designed to withstand compression forces so as to allow the transmission of forces from one side of the spacer to the other, in particular from one wall of the chamber to an opposite wall of said chamber. The spacer may be but is not necessarily rigid.

According to a preferred embodiment, the working fluid is water obtained by membrane distillation of seawater.

Membrane distillation is a technique that significantly reduces the energy consumption per liter of drinking water produced compared to ordinary distillation. Also, with the present invention at least part of the energy needed for pumping seawater in a DCMD unit can be generated using low-grade thermal energy. In the present application the term seawater means any water with an NaCl content of more than 1 g/l. For membrane distillation, solar heat may be used. According to a preferred embodiment, this heat is heat from the condenser in the steam cycle of a Concentrated Solar Power (CSP) plant. In practice these plants require adequate cooling to enjoy a high Carnot efficiency. Adequate cooling costs energy and capital costs (e.g. a cooling tower). With the method according to the invention, heat obtained by cooling can be used for both the generation of work and distilled water.

Finally, the present invention relates to an apparatus for converting thermal energy into mechanical energy, said apparatus comprising a converter for generating mechanical energy, wherein the apparatus comprises a direct contact membrane distillation (DCMD) unit, comprising a space between
- an impermeable, heat-exchanging wall
- a membrane capable of excluding liquid and allowing the passage of vapour of a liquid to a space for distillate, said space being connected to a converter for generating mechanical energy from a stream of said pressurized distillate.

Such an apparatus is very suitable for use in the method according to the invention. In case of water as a working liquid, the membrane will in general provide a hydrophobic barrier. The pore size of a porous membrane is typically smaller than 1.0 µm, preferably between 0.0001 and 0.1 µm, such as between 0.001 and 0.1 µm. To operate at higher pressures, smaller pore sizes will be chosen. In general, the so-called liquid entry pressure (LEP) of the membrane structure at the distillate side determines the maximal pressure attainable in this distillate liquid for generating mechanical energy using this invention.

According to a favourable embodiment, the apparatus comprises a direct contact membrane distillation (DCMD) unit, wherein the DCMD unit comprises a first chamber and a second chamber, the first chamber having a first inlet for a relatively cold liquid and first outlet for relatively warm liquid, a heat exchanger for heating the relatively warm liquid, and the second chamber having a second inlet for heated relatively warm liquid to be passed in counter-current with the relatively cold liquid to result in the relatively warm liquid, where the first chamber and the second chamber are separated by
- an impermeable, heat-exchanging wall
- a membrane capable of excluding liquid and allowing the passage of vapour of the liquid in the second chamber from the second chamber to a space between the heat-exchanging wall and the membrane, said space being connected to a converter for generating mechanical energy from a stream of said pressurized distillate.

This is a more simple and compact apparatus.

According to a preferred embodiment, at least one of the first chamber and the second chamber comprises a load-bearing spacer to maintain the dimensional stability of said chamber, said load-bearing spacer allowing the passage of liquid from the inlet to the outlet of the chamber concerned.

Such an apparatus can be operated at a higher distillate pressure, and thus will result in more mechanical output.

According to a preferred embodiment, the converter is connected to a generator for generating electricity.

Electricity is a very desirable form of high-grade energy.

According to a preferred embodiment, the apparatus comprises a stack of DCMD units held together by a frame, wherein the stack comprises a pressure chamber positioned parallel to the space and connected to said space, said pressure chamber being of variable volume with a wall capable of moving perpendicular to the space.

Starting the apparatus will result in expansion of the various components of the apparatus, and the pressure chamber ensures that the DCMD units are held together without being damaged.

Figure 2:
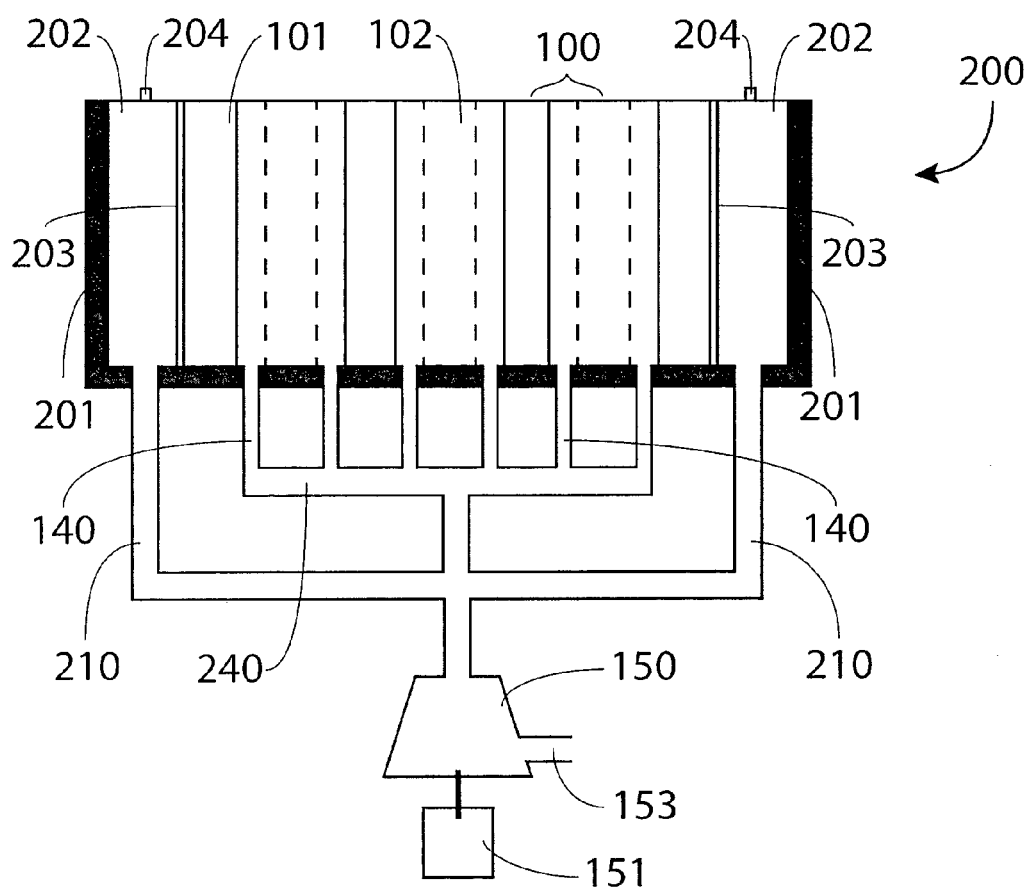

The present invention will now be illustrated with reference to the drawing where FIG. 1 schematically shows an apparatus according to the invention; and FIG. 2 shows a stack of DCMD units.

FIG. 1 shows an apparatus according to the invention comprising a DCMD unit 100 for use with water as a working liquid. The DCMD unit 100 comprises a first chamber 101 and a second chamber 102, the first chamber 101 having a first inlet 111 for relatively cold water and first outlet 112 for relatively warm water, a heat exchanger 130 for heating the relatively warm liquid even more, and the second chamber 102 having a second inlet 121 for heated relatively warm water to be passed in counter-current with the relatively cold water in the first chamber 101 to result in the relatively warm water that passes via the first outlet 112 to the heat exchanger 130. The first chamber 101 and the second chamber 102 are separated by
- an impermeable, heat-exchanging wall 104, and
- a hydrophobic membrane 105 capable of excluding liquid water and allowing the passage (short arrow) of water vapour from the second chamber 102 to a distillate chamber 103 between the impermeable, heat-exchanging wall 104 and the hydrophobic membrane 105. Condensation of the water vapour at the other side of the membrane (the side of the distillate chamber 103) results in pressurized distilled water in the distillate chamber 103. Said distillate chamber 103 is connected via a conduit 140 to a turbine 150 which in turn drives a generator 151 for generating electricity. The heat of condensation released passes via the impermeable, heat-exchanging wall 104 to the first chamber 101.

The apparatus may be advantageously be used for obtaining distilled water from seawater, in which case seawater is introduced in first inlet 111. The DCMD unit will have a second outlet 122 from which brine will be discharged. The distilled water will be collected via a third outlet 153 after the turbine 150.

To substantially maintain the dimensions of the first chamber 101 and the second chamber 102, they may be provided with a spacer 161 that keeps the walls defining the chamber concerned apart. The spacers 161 do not block the flow of liquid through a chamber. There may also be a spacer 161 in the distillate chamber 103 (not shown).

Assuming a temperature at the first inlet 111 of 30° C., at the first outlet 112 of 80°, at the second inlet 121 of 90° C. and at the second outlet of 30° C., it can be estimated that integrated in a plant for the production of fresh water (7400 m³/day) from seawater, and a turbine and generator together operating at 75% efficiency, 450 kW electricity can be produced.

A membrane of suitable porosity will be selected by the ordinary person skilled in the art based on the pressure of the stream of the pressurized distillate and the strength of the membrane material. The membranes concerned can be made of materials such as PTFE, PVDF, PP and PE. The porous membranes to be used in accordance with the present invention can be laminated with other materials (e.g. non woven materials of PP, PET etc), which protect the membranes against abrasion, and/or give mechanical support. So-called asymmetric microfiltration and ultrafiltration membranes made of materials such as polyethersulphone, polysulphone, polyacrylonitrile, polyamides can also be used. In this context and for use with water as the working fluid, it is preferable to make the surface of these membranes completely or partially additionally hydrophobic, for example by means of a coating or other surface modification. When asymmetric membranes are used the active layer of the membrane, i.e. the layer that acts as the barrier for the working liquid, with the narrowest pores, is on the distillate side. The retentate chambers (i.e. second chambers 102) can also be formed by flat plate membranes or membrane sheets, optionally in a spirally wound configuration (e.g. as known from U.S. Pat. No. 4,545,862. The pore size of a porous membrane is typically smaller than 1.0 μm, preferably between 0.0001 and 0.1 μm, such as between 0.001 and 0.1 μm. To operate at higher pressures, smaller pore sizes will be required.

Apart from polymeric membranes as mentioned above, membranes comprising other materials can be contemplated, such as from ceramic materials such as aluminium oxice, silica, zirconia, perovskites, nitrides etc.

FIG. 2 shows a schematic side view of a stack 200 of five DCMD units 100. For the sake of simplicity, the first inlet 111, the first outlet 112, the second inlet 121 and the second outlet 122 have not been shown.

The set-up has been changed slightly compared to FIG. 1, because it would not be advantageous from a thermal point of to have the back of a first chamber 101 to be in contact with the back of a second chamber 102. So, a chamber 101 will be put with its back against another chamber 101. However, in that case, the backs are no longer necessary and can be left out. Thus, a DCMD unit is now indicated with a horizontal bracket.

The stack 200 is held by a sturdy frame 201. To accommodate for changes in pressure, there is at least one pressure chamber 202 having a dimension that may vary slightly. It has for example a flexible metal wall 203 facing a DCMD unit 100. The pressure chamber 202 will be filled with distillate liquid via conduits 210. For ease of filling, an air relief cock 204 may be provided at the top of the pressure chamber 202. The pressure chambers 202 allow the stack to be built conveniently and allow for operation at various pressures. Various pressures result in more or less expansion of he DCMD units 100, and this variability is accommodated for by the pressure chambers 202 that expand more easily.

In operation, the distillate liquid under high pressure leaves the distillate chambers 103 and passes via conduits 140 and a collection conduit 240 to the turbine 150.

The invention will now be illustrated with reference to a series of examples.

EXAMPLES

1. A spiral wound module for Direct Contact Membrane Distillation was constructed using the materials:
   a membrane chamber, consisting of two sheets of symmetric porous hydrophobic PTFE membrane with a pore size of 0.1 um, and a relatively dense spacer material (type X04510, Conwed, Genk, Belgium). Both had a width of 500 mm, and an effective length of 2000 mm.
   a condenser chamber, consisting of two sheets of a laminate of aluminium foil (thickness: 0.037 mm) with a thin polyester coating on each side, and the same spacer material as inside the membrane chamber. These too had a width of 500 mm and a length of 2000 mm.
   a distillate chamber, which contained no spacer material, but was established by creating its own space between said membrane and condenser chambers.

Both the condenser chamber and the membrane chamber (the first and second chambers, respectively) were equipped with inlet and outlet headers (PVC-C tube), manually wound around a core tube, fitted into a thick-walled PVC-C tube of 160 mm outer diameter, sealed with epoxy resin, and processed into a module with inlet and outlet ports for feed, retentate and distillate; similar to the method described by W. L. Gore, U.S. Pat. No. 4,545,862 (1982).

Care was taken for a good fitting in the tube ("snug fit"), in order to prevent possible "ballooning" at elevated pressures.

Testing was carried out in a similar way to the known DCMD-process described by W. L. Gore in U.S. Pat. No. 4,545,862 (1982), using as feed a 35 g/l solution of sodium chloride in water, with flow 65 l/h:
   As heat source a water tank was used, heated by an electrical heater, set at 65° C., equipped with a large quantity (around 15 m) of silicone tubing as heat exchanger.
   Inlet temperature of the feed was 18° C.; outlet T of the condenser chamber was 53° C. at equilibrium condition (after ca. 2 hours); inlet T of the membrane chamber (after passage through the heat exchanger) was 61° C.; outlet T of the retentate (brine) was 25° C.; outlet T of the distillate stream was 30° C.
   The distillate was taken from the top and outside part of the vertically placed module, with free outflow, implying that the distillate chamber in the module was fully filled with distilled water (true DCMD), and that the sensible heat of the distillate was for a large part recovered by passing the heat counter-currently to the feed stream (similar to the process of U.S. Pat. No. 4,545,862). The gauge pressure of the distillate at the outlet was 0 bar (atmospheric pressure).

The production of distillate was 3.7 l/h, yielding a flux of 2.2 l/m$^2$.h (effective membrane area 1.66 m$^2$).

The conductivity of the distillate was 60 microSiemens/cm after 4 h, and still decreasing rapidly. The conductivity of the feed was 48 milliSiemens/cm.

2. Using the same module and method as in example 1, it was tested if it was feasible to create mechanical power:

After the 4 hours of exp. 1 the distillate flow was gradually throttled using a simple throttling valve.

It was observed that, after ca. 30 minutes of very low flux, the flux increased and at a set distillate gauge pressure of 1 bar stabilized at 3.61 l/h after 2 h: almost the same flux as in ex. 1.

All temperatures were about the same as ex. 1; the conductivity of the distillate, after a first increase, decreased again to 48 microSiemens/cm after 2 h.

The pressure of 1 bar in the distillate stream indicates that it is possible to create mechanical power from a heat source, using a DCMD process with minor adaptation.

3. Using the same module and method as for example 1 and 2, attempts were made to more generate mechanical power according to the invention:

First, the DCMD process was started at similar conditions as example 1, without throttling the distillate stream. A similar flux, of 2.2 l/m$^2$.h, was observed. The conductivity decreased further, to a value of 32 microSiemens/cm after 1 h.

The heat source was then set at an elevated temperature, of 85° C., in order to create more driving force and flux. The feed flow was increased to 96 l/h, for the same purpose.

Inlet temperature of the feed was 19° C.; outlet T of the condenser chamber was 72° C. at equilibrium condition (after ca. 1 hour); inlet T of the membrane chamber (after passage through the heat exchanger) was 79° C.; outlet T of the retentate (brine) was 25° C.; outlet T of the distillate stream was 33° C.

This yielded a considerably higher production of distillate of 8.2 l/h, or a flux of 4.9 l/m$^2$.h. The conductivity increased slightly, to a value of 38 microSiemens/cm after 2 h.

After 3 hours the distillate flow was gradually throttled using a simple throttling valve.

It was observed that, after ca. 20 minutes of low flux, the flux increased and at a set distillate gauge pressure of 1 bar stabilized at 8.0 l/h after 2 h: almost the same flux as without throttling.

Throttling to 2 bars gave, after ca. 10 minutes of low flux, a value of 7.9 l/h. It was also observed that the conductivity decreased fast, to a value of 16 microSiemens/cm after 4 h.

Throttling to 3 bars gave, again after ca. 10 minutes of low flux, a value of 7.7 l/h. The conductivity decreased to a value of 9 microSiemens/cm after 5 h.

Throttling to 4 bars gave after ca. 5 minutes of low flux, a similar flux of 7.7 l/h. The conductivity decreased further, to a value of 6 microSiemens/cm after 5.5 h.

After 5.5 hours it was decided to increase the heater temperature further, in order to further increase the flux and the production of mechanical power. The heater tank was heated to 100° C. (boiling water), and the feed flow was increased to 124 l/h.

The outlet T of the condenser chamber increased to 83° C. after ca. 1 hour); inlet T of the membrane chamber (after passage through the heat exchanger) was 88° C.; outlet T of the retentate (brine) was 25° C.; outlet T of the distillate stream was ca. 36° C.

The distillate pressure increased to 5.1 bar, at which level a production flow was measured of ca. 11.8 l/h (flux=7.1 l/m$^2$.h).

When increasing the pressure even further, an epoxy seal in the experimental set-up failed, preventing further measurements. It is important to note that the failing seal is not an inherent flaw of the present invention.

The invention can be modified within the scope of the appending claims in various ways. For example, an interesting option is to operate the apparatus for the generation of electricity only (provided low-grade heat is available very cheaply). In that case, pure working liquid such as water is introduced via the first inlet 111, and distillate from the third outlet 153 is passed to the first inlet 111 (which will require some cooling of the distillate using a heat exchanger). The second outlet 122 is not necessary.

The application also contemplates a method for transporting distilled water, wherein water vapour passed through a unit comprising a distillate chamber with an outlet for distillate, the distillate chamber being defined by a membrane permeable to water vapour and impermeable to liquid water, wherein the distillate chamber is cooled, causing the water vapour to condense so as to from distilled water at a pressure of at least one bar (preferably at least 5 bar, such as at least 10 bar), and the pressure is used to transport the distilled water to a desired location. This location may be more than 100 m away, such as more than 500 m away and even many kilometers away. For transport over longer distances, higher pressures are preferred. According to a preferred embodiment impure water such as seawater as defined above is distilled, resulting in distilled water under pressure. Thus the use of a pump for transporting the distilled water can be done without with, even for transport over long distances. The distillation will be in counter current, such as for example shown in FIG. 1 (with the convertor may be absent or not used). The membrane will for example be part of a direct contact membrane distillation (DCMD) unit, such as one described above. According to a preferred embodiment, retentate liquid is passed along the membrane at the opposite side of the membrane of the unit. The retentate liquid is relatively warm with respect to the distillate liquid at the other side of the membrane. Heat is preferably waste heat or solar heat. Thus the membrane unit operates as a pump without moving parts, and thus very reliable.

An interesting alternative preferred embodiment is condensing a vapour (e.g. water vapour from a power plant of any kind which generates steam using heat), wherein the vapour is condensed via a membrane to result in liquid at a pressure at the distillate side of the membrane which is higher than at the side of the membrane where the vapour is supplied.

The invention claimed is:

1. A method of converting thermal energy into mechanical energy, the method comprising:

evaporating a working liquid to generate a stream of a working fluid, wherein the stream of the working fluid is a stream of pressurized distillate produced by evaporation and condensation using a direct contact membrane distillation (DCMD) unit (100), said stream of pressurized distillate having a pressure of at least one bar; and generating mechanical energy from said stream of pressurized distillate in a converter (150);

wherein said DCMD unit (100) comprises a membrane (105) capable of excluding the working liquid and allowing the passage of a vapor of the working liquid to a space (103) for said pressurized distillate, wherein a difference in pressure is maintained over the membrane (105) such that a pressure at a distillate side of the membrane is higher than a pressure at the other side of the membrane, with the membrane (105) being configured to exclude the working liquid from passage into the membrane under the difference in pressure, and with the vapor of the working liquid passing into and through the membrane (105) from the other side of the membrane to the distillate side of the membrane while the difference in pressure is maintained; and wherein the generation of mechanical energy comprises throttling said stream of pressurized distillate in said converter (150).

2. The method according to claim 1, wherein the converter (150) is connected to a generator (151) for generating electricity.

3. The method according to claim 1, wherein the DCMD unit (100) comprises a first chamber (101) and a second chamber (102), the first chamber (101) having a first inlet (111) for a relatively cold liquid and first outlet (112) for a relatively warm liquid, a heat exchanger (130) for heating the relatively warm liquid, and the second chamber (102) having a second inlet (121) for the heated relatively warm liquid to be passed in counter-current with the relatively cold liquid to result in the relatively warm liquid, the second chamber (102) comprising a load-bearing spacer (161) to maintain the dimensional stability of said chamber, said load-bearing spacer (161) allowing the passage of liquid from the inlet to the outlet of the second chamber (102), where the first chamber (101) and the second chamber (102) are separated by an impermeable, heat-exchanging wall (104), the membrane (105), and the space (103), the space (103) being disposed between the heat-exchanging wall (104) and the membrane (105), with condensation of the vapor against the heat-exchanging wall (104) resulting in the production of distillate in said space (103), said space (103) being connected to the converter (150).

4. The method according to claim 3, wherein the relatively warm liquid is heated by the heat exchanger (130) to a temperature of at least 80° C.

5. The method according to claim 3, wherein the first chamber (101) comprises a load-bearing spacer (161) to maintain the dimensional stability of said chamber, said load-bearing spacer (161) allowing the passage of liquid from the inlet to the outlet of the first chamber (101).

6. The method according to claim 3, wherein the working fluid is water obtained by membrane distillation of seawater and wherein said membrane is made additionally hydrophilic by a coating.

7. An apparatus for converting thermal energy into mechanical energy, said apparatus comprising:
a converter (150) for generating mechanical energy; and
a direct contact membrane distillation (DCMD) unit (100) providing a space (103) between an impermeable, heat-exchanging wall (104) and a membrane (105), the membrane (105) being capable of excluding a liquid and allowing the passage of a vapour of the liquid to the space (103) for the production of a stream of pressurized distillate, said space (103) being connected to the converter (150) for generating mechanical energy from the stream of pressurized distillate;
wherein the DCMD unit maintains a difference in pressure over the membrane (105) such that a pressure at a distillate side of the membrane is higher than a pressure at the other side of the membrane; and
wherein the membrane (105) is configured to exclude the liquid from passage into the membrane under the difference in pressure and to allow passage of the vapour of the liquid into and through the membrane (105) from the other side of the membrane to the distillate side of the membrane while the difference in pressure is maintained.

8. The apparatus according to claim 7, wherein the DCMD unit (100) comprises a first chamber (101) and a second chamber (102), the first chamber (101) having a first inlet (111) for a relatively cold liquid, a first outlet (112) for a relatively warm liquid, and a heat exchanger (130) for heating the relatively warm liquid, and the second chamber (102) having a second inlet (121) for heated relatively warm liquid to be passed in counter-current with the relatively cold liquid to result in the relatively warm liquid, a second outlet (122), and a load-bearing spacer (161) to maintain dimensional stability of said chamber, said load-bearing spacer (161) allowing the passage of liquid from the second inlet to the second outlet of the second chamber (102), where the first chamber (101) and the second chamber (102) are separated by an impermeable, heat-exchanging wall (104), the membrane (105) and the space (103), the space (103) being disposed between the heat-exchanging wall (104) and the membrane (105).

9. The apparatus according to claim 8, wherein the first chamber (101) comprises a load-bearing spacer (161) to maintain the dimensional stability of said chamber, said load-bearing spacer (161) allowing the passage of liquid from the first inlet to the first outlet of the first chamber (101).

10. The apparatus according to claim 8, wherein the converter (150) is connected to a generator (151) for generating electricity, and wherein the liquid is introduced via the first inlet (111) and the stream of pressurized distillate is passed, downstream of the converter, to said first inlet.

11. The apparatus according to claim 7, wherein the apparatus comprises a stack of DCMD units (100) held together by a frame (201), wherein the stack comprises a pressure chamber (202) positioned parallel to the space (103) and connected to said space (103), said pressure chamber (202) being of variable volume with a wall (203) capable of moving perpendicular to the space.

12. The method according to claim 3, wherein the relatively warm liquid is heated by the heat exchanger (130) to a temperature of at least 100° C.

13. The method according to claim 3, wherein the relatively warm liquid is heated by the heat exchanger (130) to a temperature of at least 120° C.

14. The method according to claim 3, wherein said space (103) is a distillate chamber, said working liquid is water, and the distillate chamber is fully filled with distilled water.

15. The method according to claim 14, wherein the distillate chamber is fully filled with distilled water taken from the top of the DCMD unit.

16. The method according to claim 1, wherein the working fluid is produced by condensing a vapor supplied at a first side of the membrane via the membrane.

17. A method of converting thermal energy into mechanical energy wherein a stream of a working fluid is generated, wherein the stream of the working fluid is a stream of a pressurized liquid produced by condensing a vapor supplied to a distillate side of a membrane (105) via the membrane to result in liquid at a pressure at the distillate side of the membrane which is higher than at the other side of the membrane from where the vapor is supplied, wherein the membrane (105) excludes the liquid from passage into the membrane (105) under the difference in pressure while allowing passage of the vapor into and through the membrane (105) from the other side of the membrane to the distillate side of the membrane while the difference in pressure is maintained, wherein a converter (150) is used for generating mechanical energy from said stream of working fluid, wherein the vapor is water vapor from a power plant, and wherein the generation of mechanical energy comprises throttling said stream of pressurized distillate in said converter (150).

18. A method for transporting distilled water, comprising:
passing water vapor through a membrane of a unit comprising a distillate chamber having an outlet for distillate, the distillate chamber being defined by the membrane, wherein the membrane is permeable to water vapour and impermeable to liquid water, and wherein the distillate chamber is cooled;
condensing the water vapour in the distillate chamber to form distilled water at a pressure higher than a pressure at the other side of the membrane, wherein the condensing pressure is at least one bar, and wherein the membrane excludes the liquid water from passage into the membrane under the difference in pressure while allowing passage of the water vapour into and through the membrane to the distillate side of the membrane from the other side of the membrane while the difference in pressure is maintained; and
using the condensing pressure to transport the distilled water to a location separated from the unit by a distance that is more than 100 m.

19. The method of claim 1 where said pressure at the distillate side of the membrane is at least 5 bar higher than said pressure at the other non-distillate side of said membrane.

20. The method of claim 1, wherein the membrane provides a hydrophobic barrier, and wherein the pressure at the distillate side is lower than the Liquid Entry Pressure of the membrane at the distillate side and wherein the membrane is an asymmetric membrane comprising a layer that acts as barrier for the liquid, wherein said layer is provided on the distillate side of the membrane and includes pores having a pore size between 0.0001 µm and 0.1 µm.

21. A method of operating a membrane distillation unit as a pump to provide pressurized distillate having a pressure of at least one bar gauge, wherein the membrane distillation unit is a direct contact membrane distillation unit comprising a porous hydrophobic membrane capable of excluding liquid and comprising pores, the method comprising evaporating liquid at one side of the membrane to provide vapor into said pores, allowing transport of vapor through the membrane through said pores, and condensing the vapor into distillate liquid in contact with the other side of the membrane, wherein a difference in pressure is maintained over the membrane such that the pressure at a distillate side of the membrane is higher than a pressure at the other side of the membrane, and wherein the membrane excludes the liquid from passage into the membrane under the difference in pressure while allowing passage of the vapor into and through the membrane from the other side of the membrane to the distillate side of the membrane while the difference in pressure is maintained.

22. The method of claim 1 where said pressure at the distillate side of the membrane is at least 1 bar higher than said pressure at the other non-distillate side of said membrane.

* * * * *